United States Patent [19]

Sakamoto

[11] Patent Number: 5,001,627
[45] Date of Patent: Mar. 19, 1991

[54] MULTIPROCESSOR CONTROL SYSTEM FOR SELECTIVELY EXECUTING VECTOR INSTRUCTIONS FROM SCALER UNITS TO BE EXECUTED IN A VECTOR UNIT

[75] Inventor: Kazushi Sakamoto, Kawasaki, Japan

[73] Assignee: Fujitsu Limited, Kawasaki, Japan

[21] Appl. No.: 362,601

[22] Filed: Jun. 7, 1989

[30] Foreign Application Priority Data

Jun. 7, 1988 [JP] Japan .............................. 63-140297

[51] Int. Cl.[5] .................... G06F 15/347; G06F 15/31; G06F 9/30
[52] U.S. Cl. .................................. 364/200; 364/228; 364/231.8; 364/232.9; 364/232.21; 364/234; 364/239; 364/247; 364/254.8; 364/259.1; 364/262.4; 364/264; 364/270
[58] Field of Search ... 364/200 MS File, 900 MS File

[56] References Cited

U.S. PATENT DOCUMENTS

| | | | |
|---|---|---|---|
| 4,152,763 | 5/1979 | Shimoi | 364/200 |
| 4,507,728 | 3/1985 | Sakamoto et al. | 364/200 |
| 4,760,525 | 7/1988 | Webb | 364/200 |
| 4,875,161 | 10/1989 | Lahti | 364/200 |
| 4,903,196 | 2/1990 | Pomerene et al. | 364/200 |

*Primary Examiner*—Archie E. Williams, Jr.
*Assistant Examiner*—Emily Y. Chan
*Attorney, Agent, or Firm*—Staas & Halsey

[57] ABSTRACT

A multiprocessor control system adapted to a multiprocessor system includes a switching circuit, a control stage circuit, a switching mode setting circuit, and a switching control circuit. The switching circuit selectively switches a second group of instructions supplied from first execution units to select the second group of instructions relating to one of the first execution units. The control stage circuit includes a plurality of register stages used for controlling a pipeline process. The control stage circuit sequentially stores the second group of instructions relating to the selected one of the first execution units in the register stages and outputs, for every register stage, a state indicating signal indicating state information regarding the corresponding register stage. The switching mode setting circuit generates a mode setting signal used for selecting one of a plurality of switching modes each defining a timing with which switching by the switching circuit occurs. The switching control circuit generates the switching signal based on the state indicating signals output from the control stage circuit and the mode setting signal indicative of one of the plurality of switching modes supplied from the switching mode setting circuit.

19 Claims, 10 Drawing Sheets

SWITCHING MODE 1

SWITCHING MODE 2

SWITCHING MODE 3

MULTIPROCESSOR CONTROL SYSTEM FOR SELECTIVELY EXECUTING VECTOR INSTRUCTIONS FROM SCALER UNITS TO BE EXECUTED IN A VECTOR UNIT

BACKGROUND OF THE INVENTION

The present invention generally relates to a multiprocessor system, and particularly to a multiprocessor system having a plurality of scalar units and a single vector unit which selectively executes vector instructions supplied from the scalar units. More particularly, the present invention relates to a control system which selects vector instructions from the scalar units to be executed in the vector unit.

Conventionally, there is known, as a computer for technological computation, a multiprocessor system having a plurality of scalar units each processing a scalar instruction, and a single vector unit which processes a vector instruction at high speeds. In such a multiprocessor system, a vector instruction is executed in such a way that the right to use the vector unit is selectively assigned the plurality of scalar units. Conventionally, since the vector unit includes pipelines each consisting of a plurality of processing stages, it takes a long time to start executing a vector instruction after the vector instruction is selected.

Therefore, it is desired to switch one scalar unit to another scalar unit, before the execution of a scalar instruction being processed is completed to thereby enhance the efficiency of processing. However, it is impossible to satisfy a variety of needs for multiprocessor systems by simply selecting one of the scalar units before the execution of a scalar instruction is completed. For example, generally, a multiprocessor system records how long the vector unit is exclusively used for each scalar unit, on the basis of a timing with which the scalar unit being selected is switched to another scalar unit. The recorded time is based on accounting. It is understood that accounting is no longer performed accurately in the case where the switching of the connection between the vector unit and one of the scalar units is performed before the execution of a scalar instruction being processed is not completed. Further, there is also a need for efficiently carrying out a computation irrespective of operating time.

SUMMARY OF THE INVENTION

It is therefore a general object of the present invention to provide an improved multiprocessor control system in which the above-mentioned disadvantages are eliminated.

A more specific object of the present invention is to provide a multiprocessor control system capable of satisfying a variety of needs by selectively setting a timing with which the right to use a vector unit is switched among scalar units.

The above objects of the present invention can be achieved by a multiprocessor control system adapted to a multiprocessor system including a plurality of first execution units each processing a first group of instructions, and a single second execution unit processing a second group of instructions supplied from the plurality of first execution units. The second execution unit includes a plurality of pipelines used for executing the second group of instructions. The multiprocessor control system comprises the following circuit. A switching circuit selectively switches the second group of instructions supplied from the first execution units to thereby select the second group of instructions relating to one of the plurality of first execution units. A control stage circuit includes a plurality of register stages used for controlling a pipeline process. The control stage circuit sequentially stores the second group of instructions relating to the selected one of the first execution units in the register stages and outputs, for every register stage, a state indicating signal indicating state information on the corresponding register stage. A switching mode setting circuit generates a mode setting signal used for selecting one of a plurality of switching modes each defining a timing with which the switching by the switching circuit is done. A switching control circuit generates the switching signal based on the state indicating signals output from the control stage circuit and the mode setting signal indicative of one of the plurality of switching modes supplied from the switching mode setting circuit. The switching mode setting circuit is controlled so as to select one of the switching modes which defines a timing making it possible to accurately record each of the first execution units for accounting, for example. On the other hand, the switching mode setting circuit is controlled so as to select another one of the switching modes which defines another timing making it possible to execute the second group of instructions at high speed. It is preferable that a user freely accesses the switching mode setting circuit and selects desired ones of the switching modes.

Other objects, features and advantages of the present invention will become apparent from the following detailed description when read in conjunction with the accompanying drawings.

DESCRIPTION OF THE PREFERRED EMBODIMENTS

Figure 1:
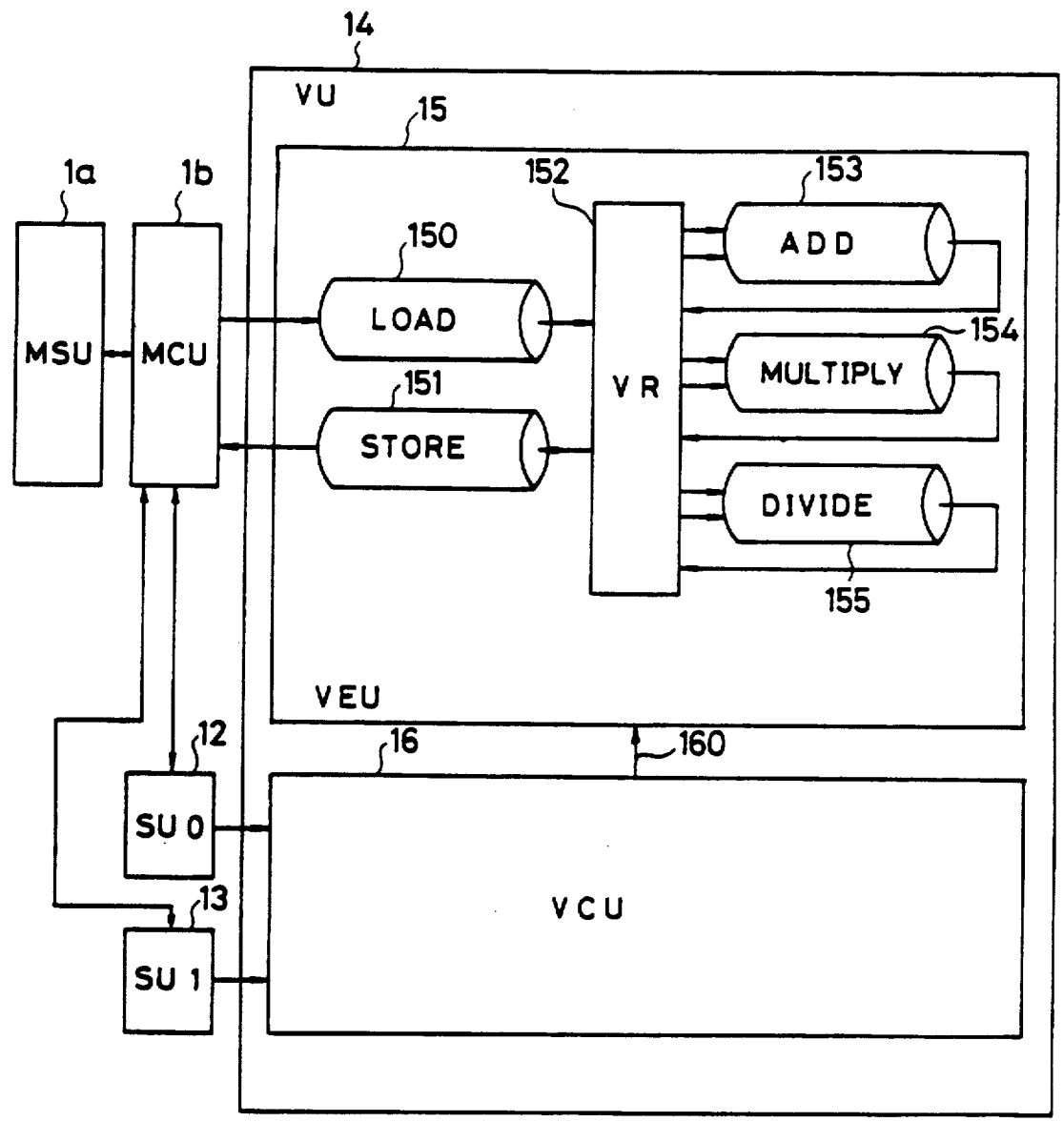
FIG. 1 is a block diagram of a multiprocessor system.

A description is now given of the overall structure of a multiprocessor system with reference to FIG. 1. The illustrated block diagram itself is described in Japanese Laid-Open Patent Application Nos. 62-9460 and 214467. It is noted that the present invention relates to an improvement of a vector control unit as will be described in detail later.

Referring to FIG. 1, a multiprocessor system includes two scalar units (SU0, SU1) 12 and 13, and a single vector unit (VU) 14. The scalar units 12 and 13 are connected to a memory control unit (MCU) 1b, which controls a main memory unit (MSU) 1a. The vector unit 14 includes a vector execution unit (VEU) 15 and a vector control unit (VCU) 16. The vector control unit 16 is connected to the scalar units 12 and 13, and the vector execute unit 15 is connected to the memory control unit 1b, and the vector control unit 16. The vector execution unit 15 is made up of a load pipeline 150, a store pipeline 151, a vector register (VR) 152, an addition pipeline 153, a multiplication pipeline 154, and a division pipeline 155.

The vector control unit 16 has the function of controlling vector instructions in a unit of instruction vector. When receiving vector instructions supplied from the scalar units 12 and 13, the vector control unit 16 enters one or more vector instructions related to a selected one of the scalar units 12 and 13. The vector control unit 16 generates supervisory information related to the pipelines 150 through 155. The generated supervisory information is transferred to the vector execute unit 15 through a signal line 160. The load pipeline 150 and the store pipeline 151 of the vector execute unit 15 are used for data transfer between the vector register 152 and the main memory unit 1a. The addition, multiplication and division pipelines 153, 154 and 155 are used for carrying out a vector operation on vector data (operand) read out of the vector register 152, and writing resultant vector data into the vector register 152.

In operation, a fetch of an instruction from the main memory unit 1a is carried out by the scalar units 12 and 13. When each of the scalar units 12 and 13 fetches a scalar instruction, it executes the related scalar instruction therein. On the other hand, when each of the scalar units 12 and 13 fetches a vector instruction, it passes the vector instruction to the vector control unit 16. The vector unit 14 selects vector instructions supplied from the scalar units 12 and 13, and executes the same. When the vector execute unit 15 has processed a packet consisting of a plurality of consecutive vector instructions supplied from either the scalar unit 12 or 13, the vector control unit 16 can select vector instructions supplied from the other scalar unit and execute the same.

Each of the scalar units 12 and 13 includes a timer called a CPU timer used for recording the time it takes to execute an instruction (a CPU operating time). The CPU timer of each of the scalar units 12 and 13 is controlled as will be described later. During the time when one of the scalar units 12 and 13 is selected, vector instructions related to the other scalar unit are inhibited from being executed in the vector unit 14, and therefore the CPU timer in the related scalar unit is set to be inactive.

Figure 2A:
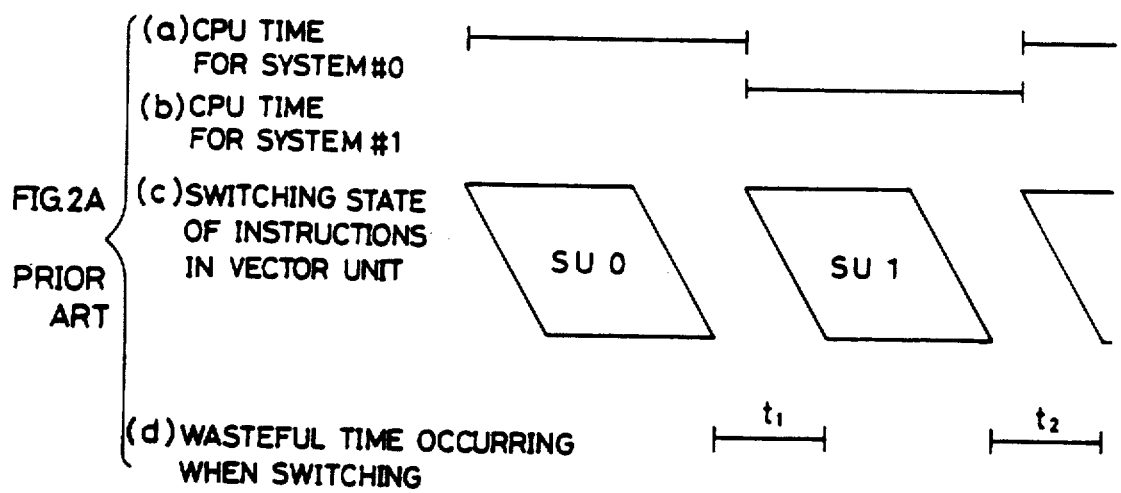
FIGS. 2A and 2B are timing charts illustrating a conventional scalar unit switching process.
Figure 2B:
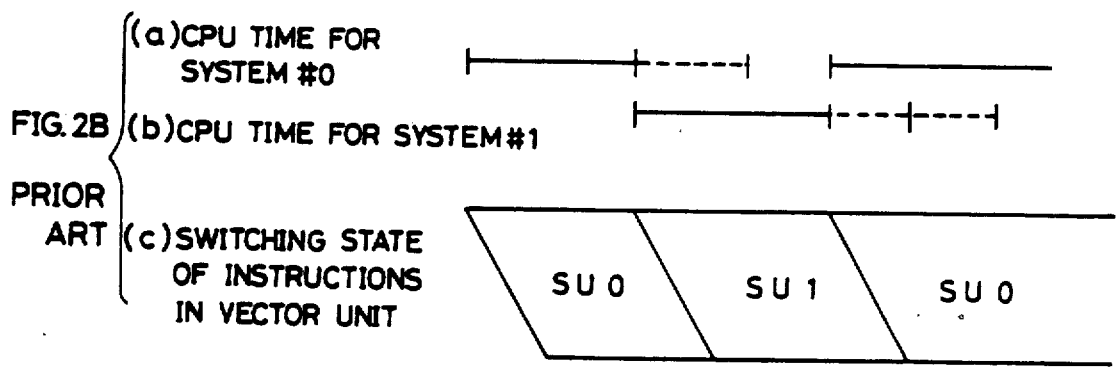

FIGS. 2A and 2B illustrate the relationships between the switching between the scalar units 12 and 13 and respective CPU operating times. Referring to FIG. 2A, the CPU timer of the scalar unit 12 (system #0) records the CPU operating time during the time when the vector unit 14 is coupled to the scalar unit 12. When the vector instructions relating to the scalar unit 12 are completely processed, the scalar unit 13 (system #1) becomes coupled to the vector unit 14 in place of the scalar unit 12. At this time, the CPU timer of the scalar unit 12 stops recording the CPU operating time, and, the CPU timer of the scalar unit 13 starts recording. In this case, it is possible to obtain an accurate CPU operating time. However, an overhead occurring at the time of switching is large, and therefore, the above process wastes time as shown by intervals $t_1$ and $t_2$.

On the other hand, as shown in FIG. 2B, the scalar units 12 and 13 are selectively connected to the vector unit 14, before the vector unit 14 has processed all the vector instructions (in the illustrated case, the vector unit starts processing the vector instructions supplied from the scalar unit 13 when the execution of the last vector instruction related to the scalar unit 12 is started). In this case, the overhead time can be extremely reduced. However, it is impossible to record the CPU operating time with precision.

The present invention makes it possible to selectively provide a timing with which the scalar unit to be connected to the vector unit 14 is switched.

Figure 3:
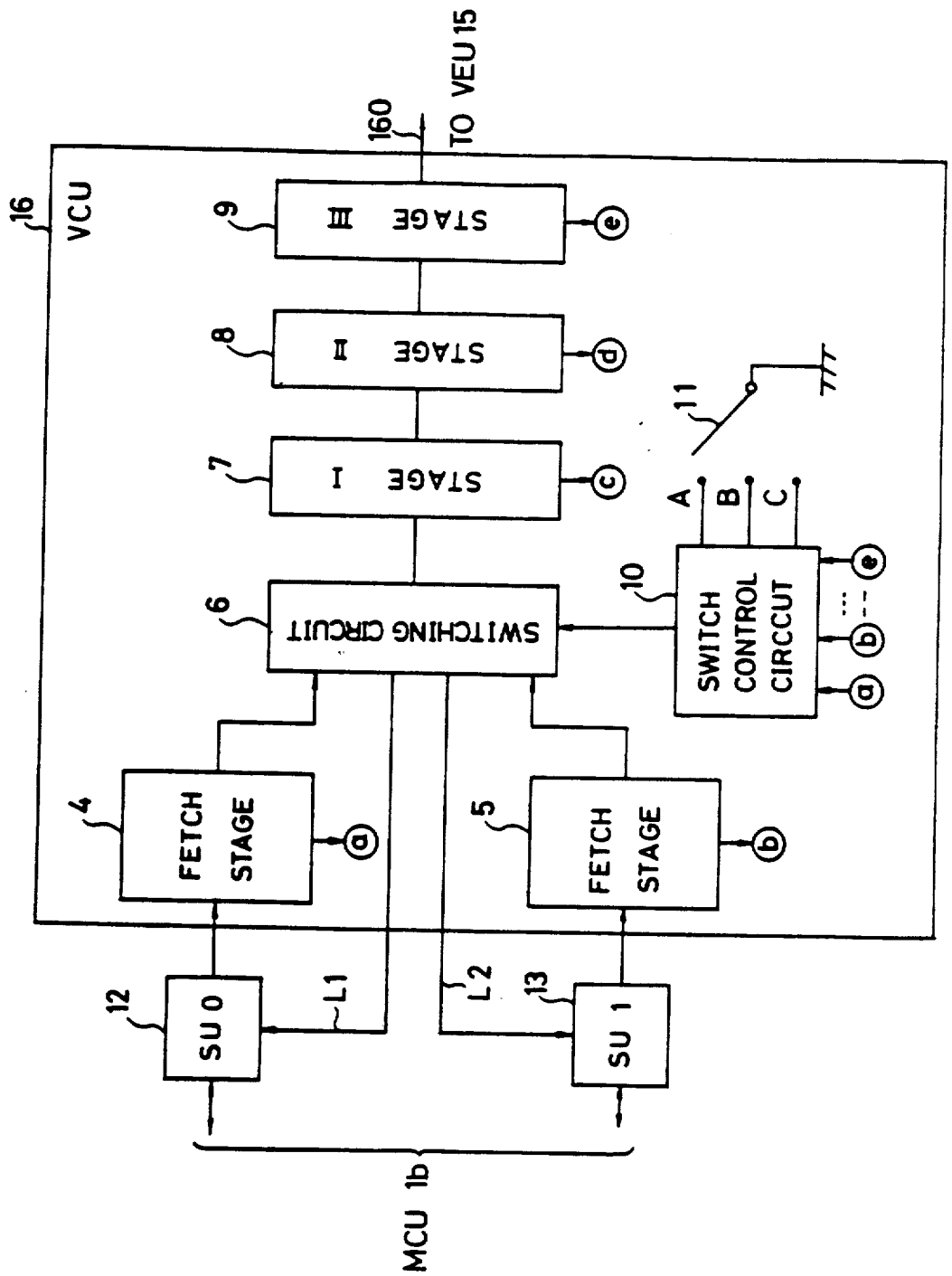
FIG. 3 is a block diagram of a vector control unit in a multiprocessor system according to the present invention.

A description is given of a fundamental construction of the present invention with reference to FIG. 3. Essential features of the present invention exist in the construction of the vector control unit 16. Referring to FIG. 3, the vector control unit 16 includes fetch stages 4 and 5 (related to the scalar units 12 and 13, respectively), a switching circuit 6, three stages 7, 8 and 9 provided for the pipeline process of vector instructions, a switching control circuit 10, and a mode setting switch 11. The mode setting switch 11 is used for selecting one of a plurality of switching modes (three modes A, B and C are provided in the illustrated structure). The switching control circuit 10 is informed of the selected mode by a switching mode signal supplied from the mode setting switch 11. The switching control circuit 10 is supplied with state indicating signals a through e, which are output from the fetch stages 4 and 5, and the first, second and third stages 7, 8 and 9, respectively. When the state indicating signals a through e become indicative of the switching mode designated by the mode setting switch 11, the switching control circuit 10 supplies a related switch signal to the switching circuit 6.

During operation, vector instructions supplied from the scalar units 12 and 13 are stored in the fetch stages 4 and 5, respectively. Then the switching circuit 6 selects either the fetch stage 4 or the fetch stage 5, depending on the switch signal supplied from the switching control circuit 10. The selected vector instruction is sequentially processed in the first, second and third stages 7, 8 and 9. The switching control circuit 10 can discriminate which one of the stages the vector instruction proceeds to based on the state indicating signals a through e. For example, each of the state indicating signals represents presence/absence of a vector instruction therein. When a vector instruction exists, each state indicating signal indicates the scalar unit to which the stored vector instruction is related.

As described previously, the mode setting switch selects one of the switching modes A, B and C. Examples of the switching modes A, B and C are as follows. The switching mode A is a mode in which the switching is performed when all vector instructions related to one of the scalar units 12 and 13 completely output from all the stages 4, 5, 7, 8 and 9. The switching mode B is a mode in which the switching is performed when vector instructions related to one of the scalar units 12 and 13 are completely output from the third stage 9. The mode C is a mode in which the switching is performed when vector instructions related to one of the scalar units 12 and 13 are completely output from the second stage 8. In the above-mentioned manner, the switching control circuit 10 outputs the switch signal when the selected state is detected. The right to use the vector unit 14 is given to the selected one of the scalar units 12 and 13. At the same time, the CPU timer of the selected scalar unit is started by being supplied with a timer control signal, which is derived from the switching circuit 6 and is supplied to the scalar units 12 and 13 through signal lines L1 and L2. The number of stages to be cascaded is not limited to three.

In a case where it is required to precisely record the CPU operating time for each scalar unit with precision (a multiprocessor system employing an accounting system based on the CPU operating time, for example), the mode A is selected by the mode setting switch 11. On the other hand, when it is not required to precisely record the CPU operating time, it is preferable to select the mode B or C.

Figure 4:
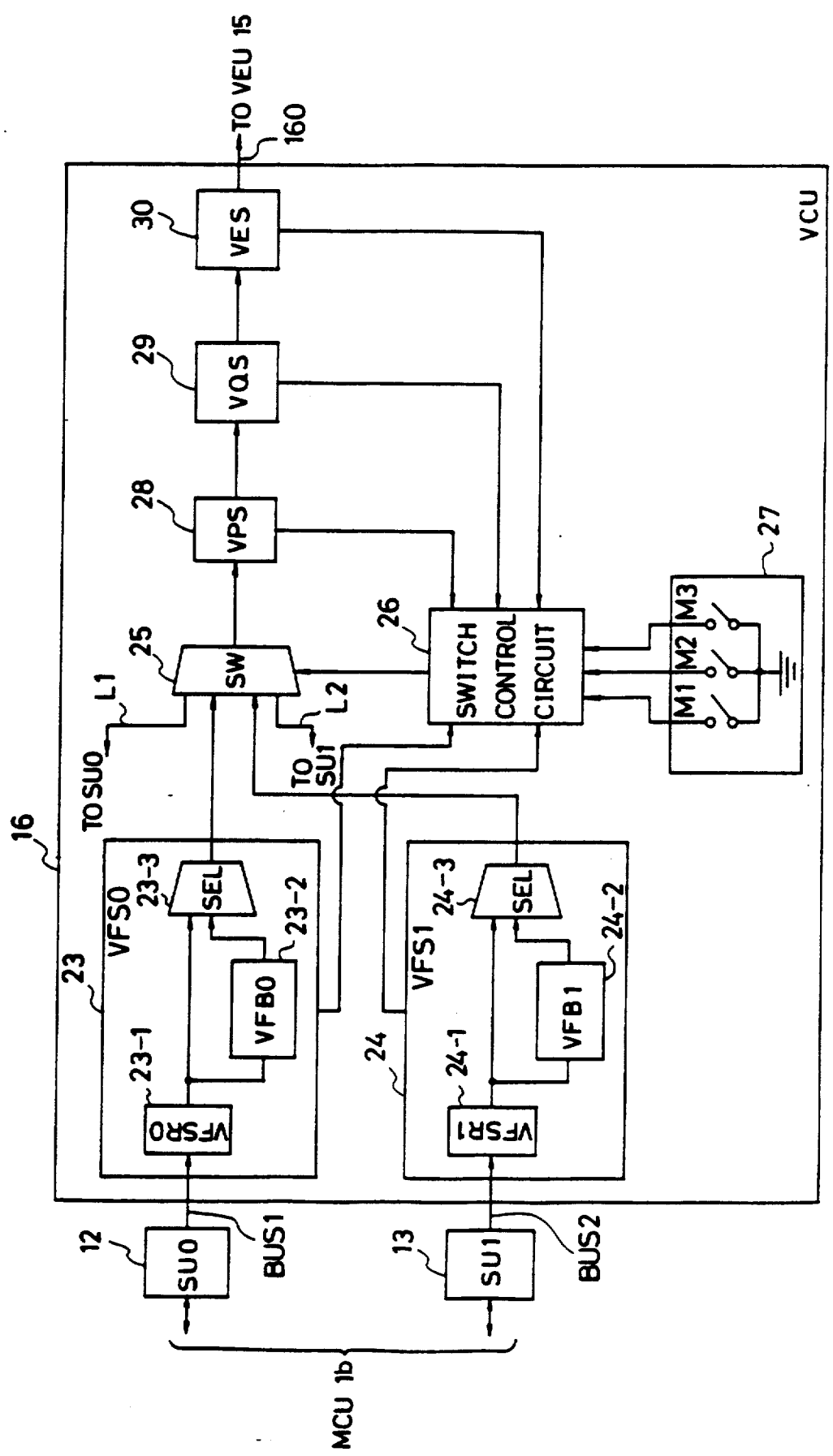
FIG. 4 is a block diagram of a vector control unit in a multiprocessor system of a preferred embodiment according to the present invention.

A description is given of a preferred embodiment according to the present invention. Referring to FIG. 4, there is illustrated a configuration of the structure of the vector control unit 16 constructed according to the embodiment of the present invention. The scalar units 12 and 13 are connected to vector fetch stages 23 and 24 (VFS0, VFS1) through buses BUS1 and BUS2, respectively. The vector fetch stage 23 includes a vector fetch stage register (VFSR0) 23-1, a vector fetch buffer (VFB0) 23-2, and a selector (SEL) 23-3. Although not illustrated for convenience, sake, the vector fetch stage 23 includes a logic circuit, which will be described in detail later. Similarly, the vector fetch stage (VFS1) 24 includes a vector fetch register (VFSR1) 24-1, a vector fetch buffer (VFB1) 24-2, a selector (SEL) 24-3, and a logic circuit (not shown). The vector fetch stages 23 and 24 correspond to the fetch stages 4 and 5 shown in FIG. 3, respectively.

The selectors 23-3 and 24-3 are connected to a switching circuit 25, which corresponds to the switching circuit 6 illustrated in FIG. 3. The switching circuit 25 is followed by a vector pre-decode stage (VPS) 28, which indicates one of the scalar units 12 and 13 to which a vector instruction existing therein is related. The state indicating signal related to the vector pre-decode stage 28 is generated therein and supplied to a switching control circuit 26. The vector pre-decode stage 28 and the switching control circuit 26 correspond to the first stage 7 and the switching control circuit 10 shown in FIG. 3, respectively. The switching control circuit 26 is supplied with busy signals derived from the aforementioned logic circuits provided in the vector fetch stages 23 and 24. The busy signals will be described in detail later.

The vector pre-decode stage 28 is connected to and precedes a vector queue stage (VQS) 29, which temporarily stores vector instructions supplied from the vector pre-decode stage 28. The state indicating signal related to the vector queue stage 29 is generated therein and supplied to the switching control circuit 26. The vector queue stage 29 corresponds to the second stage 8 shown in FIG. 3.

A vector execute stage (VES) 30 follows the vector queue stage 29, and includes a supervisory register related to each of the pipelines 150, 151, 153, 154 and 155 shown in FIG. 1. The supervisory registers store data which controls the start and end of the execution of the vector instructions to be executed in the corresponding pipelines 150, 151, 153, 154 and 155. The stage indicating signal related to the vector execute stage 30 is generated therein and supplied to the switching control circuit 26. The vector execute stage 30 corresponds to the third stage 9 shown in FIG. 3.

A mode setting circuit 27 is connected to the switching control circuit 26, and selects one of the three switching modes by closing the corresponding contact. The mode setting circuit 27 corresponds to the mode setting circuit 10 shown in FIG. 3.

During operation, vector instructions from the scalar units 12 and 13 are supplied to the vector fetch registers 23-1 and 24-1 through the buses BUS1 and BUS2, respectively. Hereinafter, an operation related to the scalar unit 12 (system #0) is described. When a vector instruction related to the scalar unit 12 is fetched by the vector fetch register 23-1, the following operation is carried out. At this time, if the vector fetch buffer 23-2 is vacant and the switching circuit 25 selects the system #0 or the vector fetch stage 23, the fetched vector instruction is supplied from the vector fetch register 23-1 to the vector pre-decode stage 28 through the selector 23-3 and the switching circuit 25. On the other hand, if there is a preceding vector instruction in the vector fetch buffer 23-2 or if the switching circuit 25 selects system #1 or the vector fetch stage 24, the fetched vector instruction relating to the scalar unit 12 is transferred from the vector fetch register 23-1 to the vector fetch buffer 23-2, and is stored therein. A vector instruction which is placed at top of the vector instructions stored in the vector fetch buffer 23-2 is read out of the vector fetch buffer 23-2, when the switching circuit 25 selects the scalar unit 12. When a vector instruction is fetched by the vector fetch register 24-1, the vector fetch stage 24 and related circuits operate in the same way as the vector fetch stage 23.

The switching control circuit 26 selectively determines which one of the vector instructions sent from the scalar units 12 and 13 should be selected and supplied to the vector pre-decode stage 28. This switching control switches the right to use the vector unit 14 in a unit of an instruction packet. An instruction packet is defined as a sequence of consecutive vector instructions which can successively be executed with no interruption thereof. Therefore, for example, the switching circuit 25 operates in such a manner that an instruction packet relating to the scalar unit 12 is completely executed, and thereafter the execution of an instruction packet relating to the scalar unit 13 is started. The right to use the vector unit 14 is exclusively switchable between the scalar units 12 and 13. When the right to use the vector unit 14 is switched, vector instructions related to one of the scalar units 12 and 13 which has obtained the right to use are set in the vector pre-decode stage 28 at the next operating stage. However, it is to be noted that it is possible to vary the timing with which the right to use the vector unit 14 is switched between the scalar units 12 and 13, as will be described in detail later.

The vector instruction selected by the selector 25 in accordance with the switching signal supplied from the switching control circuit 26, is decoded by the vector pre-decode stage 28. Thereby, it can be determined which one of the scalar units 12 and 13 the received vector instruction relates to. Then, the vector instruction in the vector pre-decode stage 28 is stored in the vector queue stage 29. Thereafter, the vector instruction read out of the vector queue stage 29 is supplied to the vector execute stage 30, which manages the access to and operation of the main memory unit 1a (FIG. 1). At the same time as the vector execute stage 30 receives the vector instruction, it sends supervisory information to one of the pipelines 150, 151, 153, 154 and 155 to be executed. Thereafter, when the execution of the vector instruction is completed, the used pipeline is released.

The switching control circuit 26 is supplied with the switching mode signal indicative of one of the switching modes M1, M2 and M3 selected by the mode setting switch 27. The switching control circuit 26 includes a first busy detecting circuit 26-1 shown in FIG. 5A relating to the scalar unit 12 (system #0), and a second busy detecting circuit 26-2 shown in FIG. 5B relating to the scalar unit 13 (system #1). An output signal of each of the first and second busy detecting circuits 26-1 and 26-2 is supplied to the switching circuit 25, a detailed configuration of which is illustrated in FIG. 6.

Figure 5A:
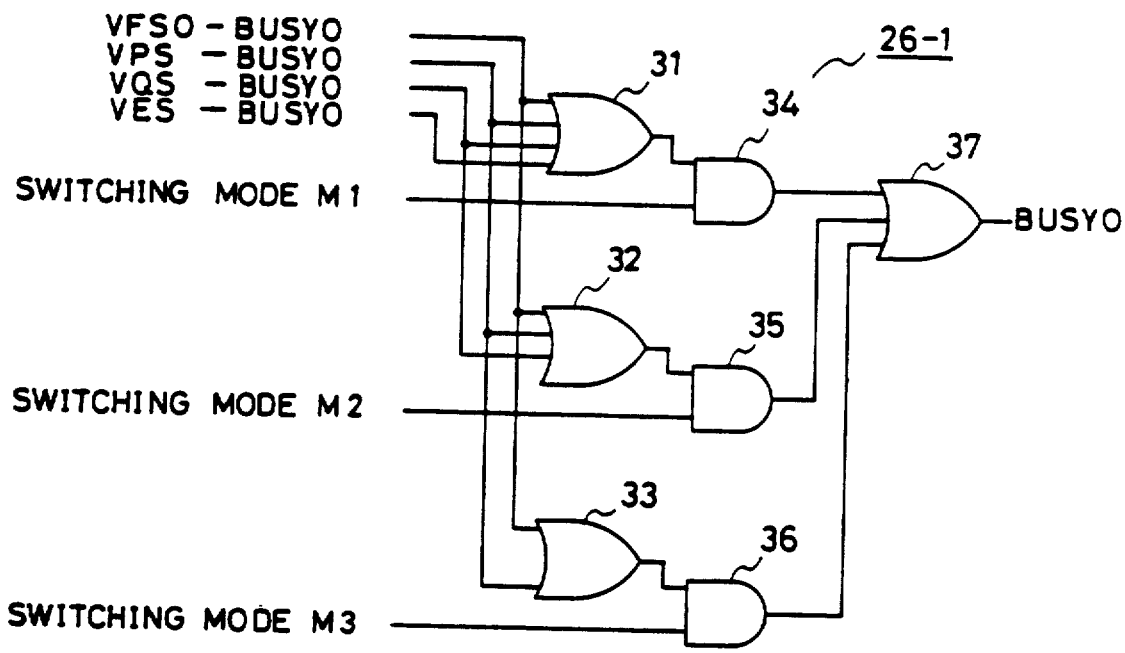
FIGS. 5A and 5B are circuit diagrams illustrating circuits included in a switching control circuit used in the embodiment shown in FIG. 4.
Figure 6:
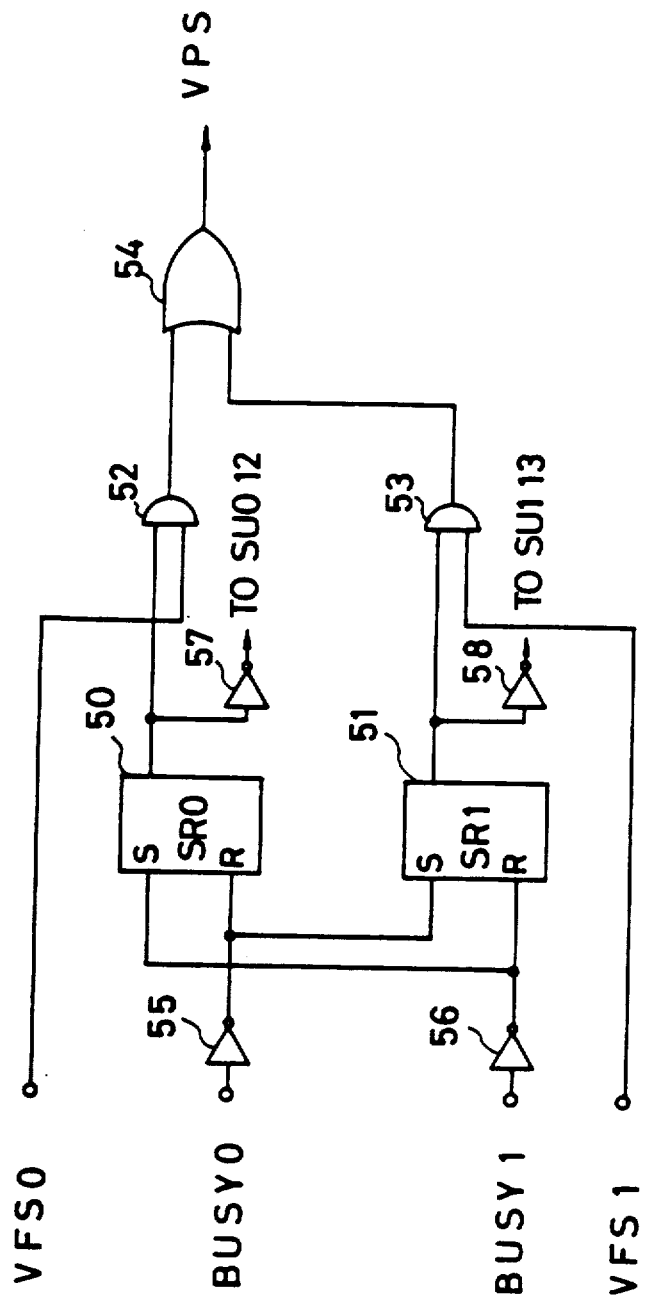
FIG. 6 is a circuit diagram of a switching circuit used in the embodiment shown in FIG. 4.

A description is given of the first busy detecting circuit 26-1 shown in FIG. 5A. Referring to FIG. 5A, a busy signal VFS0-BUSY0 generated by the vector fetch register 23-1 is supplied to OR gates 31, 32 and 33. The busy signal VFS0-BUSY0 indicates whether or not a vector instruction relating to system #0 exists in the vector fetch stage 23. A busy signal VPS-BUSY0 generated by the vector pre-decode stage 28 is supplied to the OR gates 31, 32 and 33. The busy signal VPS-BUSY0 indicates whether or not a vector instruction relating to system #0 exists in the vector pre-decode stage. 28. A busy signal VQS-BUSY0 generated by the vector queue stage 29 is supplied to the OR gates 31 and 32. The busy signal VQS-BUSY0 indicates whether or not a vector instruction relating to system π0 exists in the vector queue stage 29. A busy signal VES-BUSY0 generated by the vector execute stage 30 is supplied to the OR gate 31. The busy signal VES-BUSY0 indicates whether or not a vector instruction relating to system #0 exists in the vector execute stage 30. Output terminals of the OR gates 31, 32 and 33 are connected to input terminals of AND gates 34, 35 and 36, respectively. The switching mode signals M1, M2 and M3 derived from the mode setting circuit 27 are supplied to the AND gates 34, 35 and 36, respectively. Output terminals of the AND gates 34, 35 and 36 are connected to input terminals of an OR gate 37, which outputs a busy signal BUSY0.

Each of the above-mentioned busy signals VFS0-BUSY0, VPS-BUSY0, VQS-BUSY0 and VES-BUSY0 is "1" when a vector instruction exists in the related stage, and is "0" when no vector instruction exists in the related stage. The OR gate 31 outputs "1" when a vector instruction exists in at least one of the four stages 23, 28, 39 and 30. The OR gate 32 outputs "1" when a vector instruction exists in at least one of the three stages 23, 28 and 29. The OR gate 33 outputs "1" when a vector instruction exists in at least one of the two stages 23 and 28. The AND gate 34 performs an AND operation on the output signal of the OR gate 31 and the switching mode signal M1. The AND gate 35 performs an AND operation on the output signal of the OR gate 32 and the switching mode signal M2. The AND gate 36 performs an AND operation on the output signal of the OR gate 33 and the switching mode signal M3. The aforementioned busy signal BUSY0 is generated by performing an OR operation on the output signals of the AND gates 34, 35 and 36 in the OR gate 37.

When the busy signal BUSY0 is "1", the busy signal BUSY0 represents that it is impossible to perform the switching based on the designated switching mode. In other words, there are vector instructions relating to system #0 in the designated stages. On the other hand, when the busy signal BUSY0 is switched to "0", this change of the busy signal BUSY0 represents that all vector instructions relating to system #0 have been output from the designated stages and therefore switching from system #0 to system #1 becomes available.

Figure 5B:
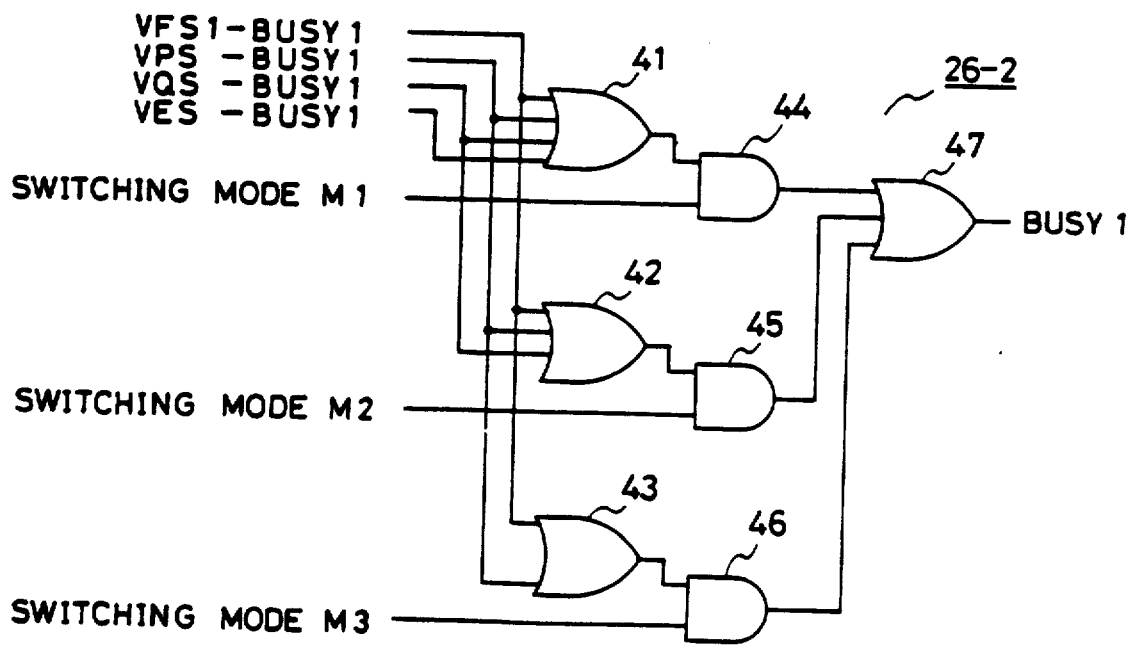

A description is given of the second busy detecting circuit 26-2 shown in FIG. 5B. Referring to FIG. 5B, a busy signal VFS1-BUSY1 generated by the vector fetch register 23-1 is supplied to OR gates 41, 42 and 43. The busy signal VFS1-BUSY1 indicates whether or not a vector instruction relating to system #1 exists in the vector fetch stage 24. A busy signal VPS-BUSY1 generated by the vector pre-decode stage 28 is supplied to the OR gates 41, 42 and 43. The busy signal VPS-BUSY1 indicates whether or not a vector instruction relating to system #1 exists in the vector pre-decode stage 28. A busy signal VQS-BUSY1 generated by the vector queue stage 29 is supplied to the OR gates 41 and 42. The busy signal VQS-BUSY1 indicates whether or not a vector instruction relating to system #1 exists in the vector queue stage 29. A busy signal VES-BUSY1 generated by the vector execute stage 30 is supplied to the OR gate 41. The busy signal VES-BUSY1 indicates whether or not a vector instruction relating to system #1 exists in the vector execute stage 30. Output terminals of the OR gates 41, 42 and 43 are connected to input terminals of AND gates 44, 45 and 46, respectively. The switching mode signals M1, M2 and M3 derived from the mode setting circuit 27 are supplied to the AND gates 44, 45 and 46, respectively. Output terminals of the AND gates 44, 45 and 46 are connected to input terminals of an OR gate 47, which outputs a busy signal BUSY 1.

Each of the above-mentioned busy signals VFS1-BUSY1, VPS-BUSY1, VQS-BUSY1 and VES-BUSY1 is "1" when a vector instruction exists in the related stage, and is "0" when no vector instruction exists in the related stage. The OR gate 41 outputs "1" when a vector instruction exists in at least one of the four stages 23, 28, 29 and 30. The OR gate 42 outputs "1" when a vector instruction exists in at least one of the three stages 23, 28 and 29. The OR gate 43 outputs "1" when a vector instruction exists in at least one of the two stages 23 and 28. The AND gate 44 performs an AND operation on the output signal of the OR gate 41 and the switching mode signal M1. The AND gate 45 performs an AND operation on the output signal of the OR gate 42 and the switching mode signal M2. The AND gate 46 performs an AND operation on the output signal of the OR gate 43 and the switching mode signal M3. The aforementioned busy signal BUSY1 is generated by performing an OR operation on the output signals of the AND gates 44, 45 and 46 in the OR gate 47.

When the busy signal BUSY1 is "1", the busy signal BUSY1 represents that it is impossible to perform the switching based on the designated switching mode. In other words, there are vector instructions relating to system #1 in the designated stages. On the other hand, when the busy signal BUSY1 is switched to "0", this change of the busy signal BUSY1 represents that all vector instructions relating to system #1 have been output from the designated stages, and therefore switching from system #1 to system #0 becomes available.

FIG. 6 illustrates an example of the structure for the switching circuit 25. As is illustrated, the switching circuit 25 includes a set-reset type latch circuit (SR0) 50 in which a set operation has priority over a reset operation, a set-reset type latch circuit (SR1) 51 in which a reset operation has priority over a set operation, AND gates 52, 53, an OR gate 54, and inverters 55, 56, 57 and 58. During operation, when both the aforementioned busy signals BUSY0 and BUSY1 are "0", the latch circuit 50 is set and the latch circuit 51 is reset. Thus, the vector instruction which is supplied from the vector fetch stage 23 and consists of a plurality of bits is input to the vector pre-decode stage 28 through the AND gate 52 and the OR gate 54.

When both the busy signals BUSY0 and BUSY1 are "1", the previous state is held. When the busy signal BUSY0 is "1" and the busy signal BUSY1 is "0", the latch circuit 50 is set and the latch circuit 51 is reset. Thereby, the vector instruction supplied from the vector fetch stage 23 is selected. On the other hand, when the busy signal BUSY0 is "0" and the busy signal BUSY1 is "1", the latch circuit 50 is reset and the latch circuit 51 is reset. Thereby, the vector instruction which is supplied from the vector fetch stage 24 and consists of a plurality of bits is selected through the AND gate 53 and the OR gate 54.

The output signal of the latch circuit 50 passes through the inverter 57 and is then supplied to the scalar unit 12. The output signal of the inverter 57 is "1" when the scalar unit 12 is not selected. At this time, the CPU timer of the scalar unit 12 is stopped. Similarly, the output signal of the latch circuit 51 passes through an inverter 58 and is then supplied to the scalar unit 13. The output signal of the inverter 58 is "1" when the scalar unit 13 is not selected. At this time, the CPU timer of the scalar unit 13 is stopped.

A description is given of the operation of the device during the switching modes M1, M2 and M3 with reference to FIG. 7.

Figure 7A:
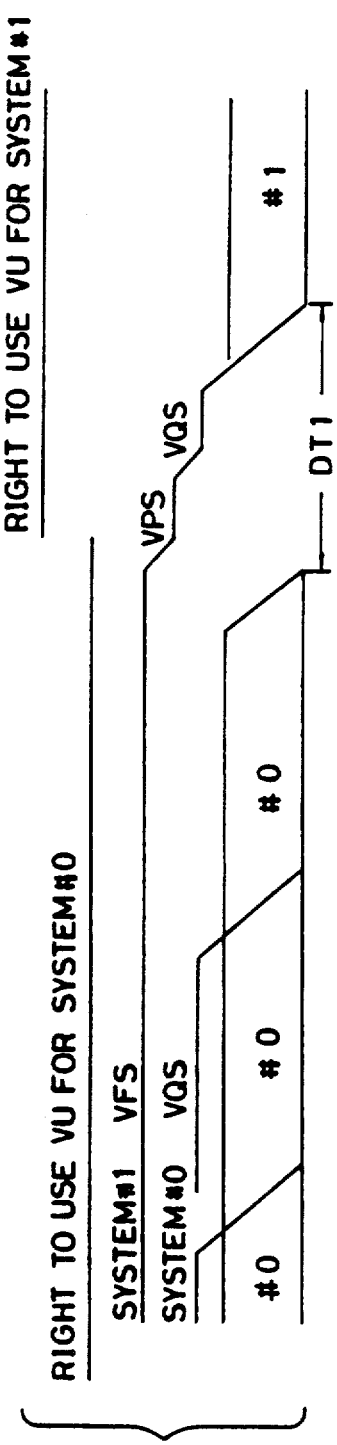
FIG. 7 is a timing chart illustrating operations of the embodiment shown in FIG. 4.

In the switching mode M1 (which is absolutely exclusive switching) shown in FIG. 7(A), when the last vector instruction of the instruction packet relating to system #0 is completed (or is output from the vector execute stage 30), the right to use the vector unit 14 assigned to the scalar unit 12 is turned OFF to thereby stop the time recording by the CPU timer of the scalar unit 12. On the other hand, the right to use the vector unit 14 is turned ON (assigned to the scalar unit 13) to thereby start the time recording by the CPU timer of the scalar unit 13. With this timing, a vector instruction is written into the vector pre-decode stage 28, and immediately written into the vector queue stage 29. In the switching mode M1, there is no overlap of CPU operating time between the systems #0 and #1. It follows that there occurs no error in the recording of the CPU operating times. However, the switching mode M1 wastes time as shown by intervals DT1 shown in FIG. 7(A).

Figure 7B:
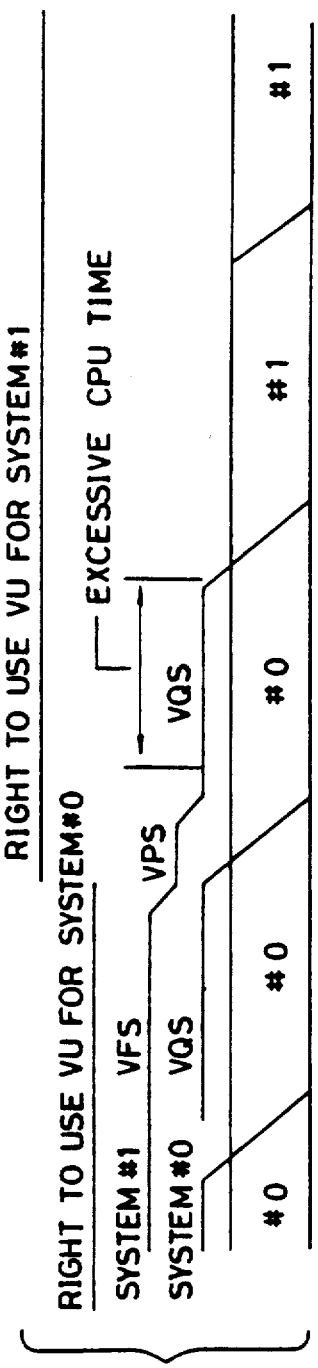

In the switching mode M2 (which is exclusive switching up to VQS) shown in FIG. 7(B), when the last vector instruction of the instruction packet relating to system #0 goes out of the vector queue stage and thereby no vector instructions relating to system #0 exist in the vector fetch stage 23, the vector pre-decode stage 28 and the vector queue stage 29. The right to use the vector unit 14 for systems #0 and #1 are turned OFF and ON, respectively. With this timing, a vector instruction is set in the vector pre-decode stage 28, and immediately set in the vector queue stage 29. It is noted that there is no problem even if the execution of the vector instructions relating to system #0 are not completed at this time. If one of the pipelines 150, 151, 153, 154 and 155, in which a vector instruction relating to system #1 (top vector instruction) is to be executed next, is being used for executing a vector instruction relating to system #0, the above vector instruction relating to system #1 waits in the vector queue stage 29 until the above pipeline is released from the exclusive use of system #0. In other cases, the vector instruction relating to system #1 is immediately sent to the designated one of the pipelines.

In the switching mode M2, "passing" with respect to the execution of vector instructions does not occur. That is, the top (first) vector instruction of the instruction packet relating to system #1 is executed after the last vector instruction of the vector packet relating to system #0 is completely executed. Further, there is a possibility that an error in the recording of the CPU operating time amounting to a maximum of one vector instruction may increase from the true value of the CPU operating time.

Figure 7C:
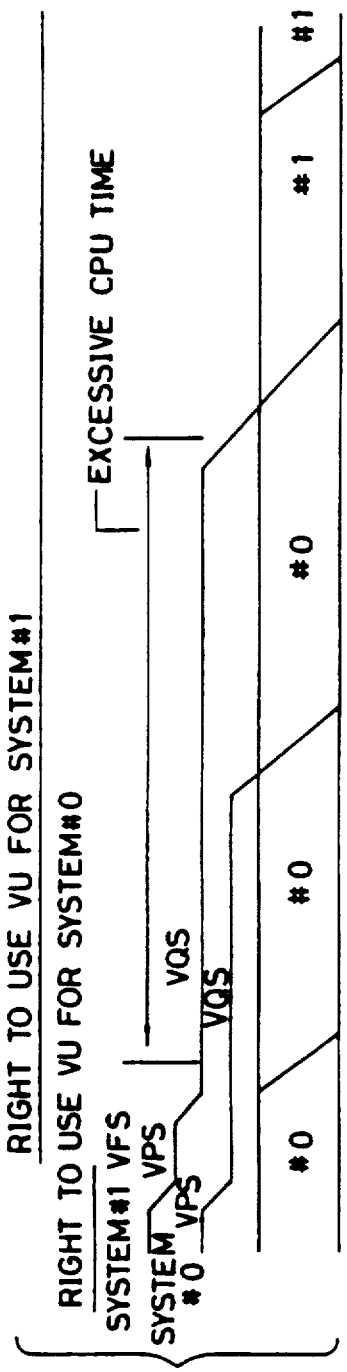

In the switching mode M3 (which is exclusive switching up to VPS) shown in FIG. 7(C), when the last vector instruction of the instruction packet relating to system #0 is written into the vector queue stage 29, and no vector instructions exist in the vector fetch stage 23 and the vector pre-decode stage 28, the right to use the vector unit 12 with respect to systems #0 and #1 are turned OFF and ON, respectively. With this timing, a vector instruction relating to system #1 is set in the vector pre-decode stage 29, and immediately written into the vector queue stage 29. At this time, there is no problem even if the execution of a vector instruction relating to system #0 is not completed. Further, the vector instruction relating to system #1 may pass one or more vector instructions relating to system #0.

Operation occurring at the time of switching from system #1 to system #0 is similar to that for switching from system #0 to system #1.

Figure 8:
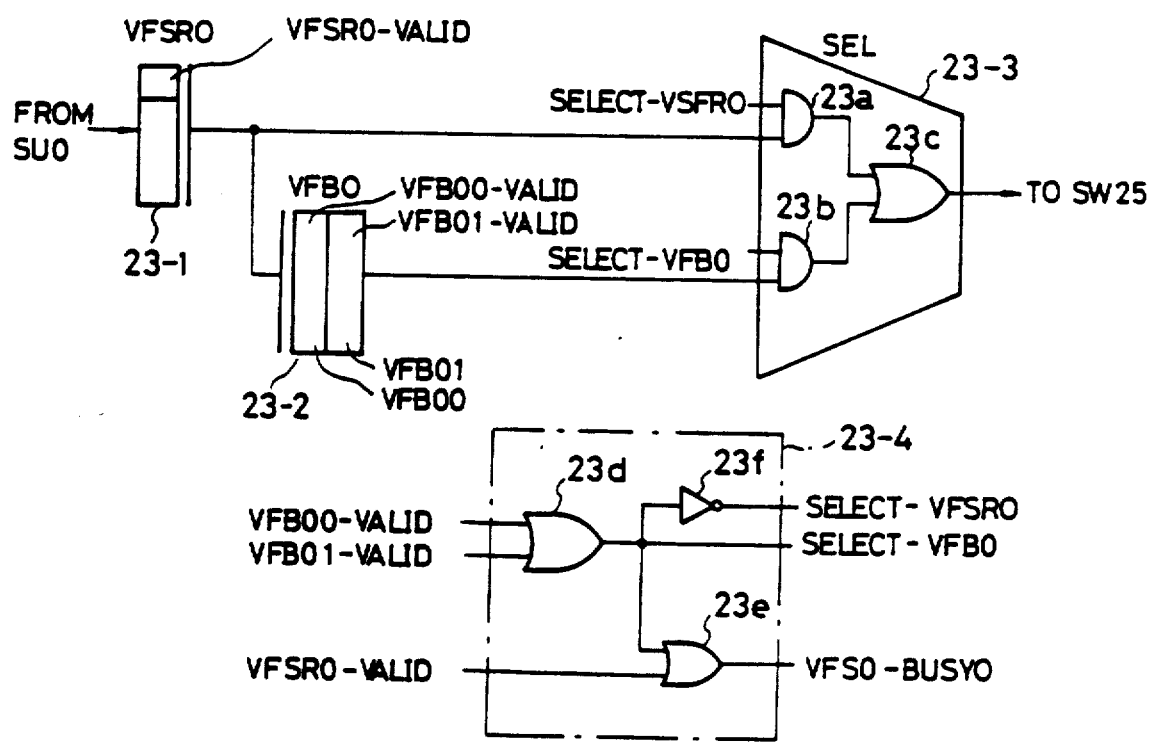
FIG. 8 is a circuit diagram of an example of the structure of a vector fetch stage used in the embodiment shown in FIG. 4.

A detailed description is given of the structure for the vector fetch stage 23 relating to the scalar unit 12 of system #0. Referring to FIG. 8, the vector fetch stage 23 includes a logic circuit 23-4 in addition to the aforementioned vector fetch register (VFSR0) 23-1, vector fetch buffer (VFB0) 23-2, and selector (SEL) 23-3. The vector fetch register 23-1 includes a flag register VFSR0-VALID. The vector fetch buffer 23-2 includes buffer portions VFB00 and VFB01. When a vector instruction is being registered in the buffer portion VFB00, "1" is written into an associated flag register VFB00-VALID. For the same purpose, a flag register VFB01-VALID is provided with respect to the buffer portion VFB00. The selector 23-3 includes AND gates 23a and 23b, and an OR gate 23c. The AND gates 23a and 23b are connected to the vector fetch register 23-1 and the vector fetch buffer 23-2, respectively. Further, the AND gates 23a and 23b are supplied with select signals SELECT-VFSR0 and SELECT-VFB0, respectively, which are generated by the logic circuit 23-4. Output terminals of the AND gates 23a and 23b are connected to the OR gate 23c, which is connected to the switching circuit 25. The logic circuit 23-4 is made up of OR gates 23d and 23e, and an inverter 23f. The OR gate 23d is supplied with the state signals stored in the flag registers VFB00-VALID and VFB01-VALID.

The OR gate 23e is supplied with the state signal stored in the flag register VFSR0-VALID and an output signal of the OR gate 23d. The output signal of the OR gate 23d is the select signal SELECT-VFB0 to be input to the AND gate 23b, and is also input to the AND gate 23a through the inverter 23f, as the select signal SELECT-VFSR0. The output signal of the OR gate 23e is the aforementioned busy signal VFS0-BUSY0.

During operation, a vector instruction supplied from the scalar unit 12 is written into the vector fetch register 23-1. At the same time, a valid signal of "1" is written into the flag register VFSR0-VALID associated with the vector fetch register 23-1. When the vector fetch buffer 23-2 does not store a vector instruction, (that is, a value of "0" is being written into both the flag registers VFB00-VALID and VFB01-VALID), the select signal SELECT VFSR0 is "1". Thereby, the selector 23-3 selects the vector instruction supplied from the vector fetch register 23-1. When a value of "1" is being written into the flag register VFB01-VALID, and a value of "0" is being written into the flag register VFB00-VALID, the vector instruction and the valid signal stored in the flag register VFSR0-VALID are transferred to the register portion VFB00 and the associated flag register VFB00-VALID. Thereby, the valid signal stored in the flag register VFB00-VALID is changed to "1". When a value of "1" is written into both the flag registers VFB00-VALID and VFB01-VALID, the vector instruction stored in the vector fetch register 23-1 is maintained therein. When either the flag register VFB00-VALID or VFB01-VALID is "1", a value of "1" is written into the select signal SELECT-VFB0, whereby the selector 23-3 selects the vector instruction which is read out of the vector fetch buffer VFB0. When a value of "1" is written into one of the flag registers VFSR0-VALID, VFB00-VALID and VFB01-VALID, the busy signal VFS0-BUSY0 becomes "1". The vector fetch stage 24 of system #1 is constructed in the same way as the above-mentioned vector fetch stage 23.

Figure 9:
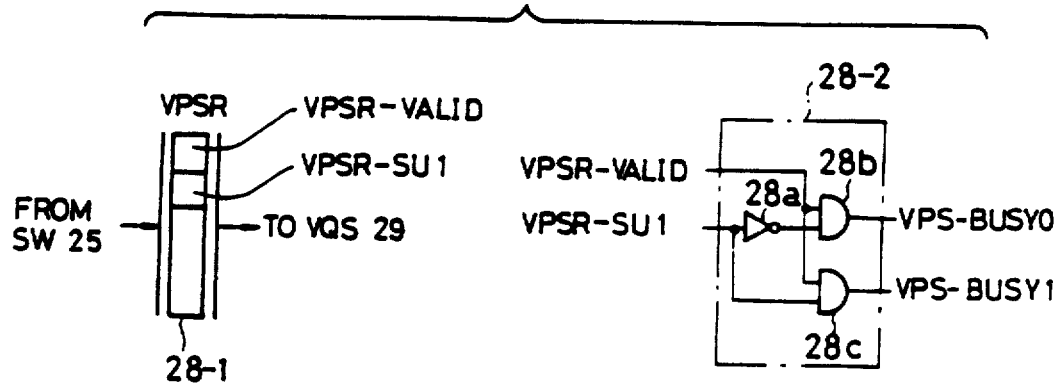
FIG. 9 is a circuit diagram of an example of the structure of a vector pre-decode stage used in the embodiment shown in FIG. 4.

FIG. 9 is an example of the structure for the vector pre-decode stage (VPS) 28. As is illustrated, the vector pre-decode stage 28 includes a vector pre-decode stage register (VPSR) 28-1, and a logic circuit 28-2 made up of an inverter 28a and AND gates 28b and 28c. The vector pre-decode stage register 28-1 includes flag registers VPSR-SU1 and VPSR-VALID. When a vector instruction is supplied to the vector pre-decode stage register 28-1 from the vector fetch stage 23, a value of "1" is written into the flag register VPSR-VALID, and a value of "0" is written into the register VPSR-SU1. On the other hand, when a vector instruction is supplied to the vector pre-decode stage register 28-1 from the vector fetch stage 24, a value of "1" is written into the flag register VPSR-VALID, and a value of "1" is written into the flag register VPSR-SU1. The state signal stored in the flag register VPSR-SU1 indicates whether the vector instruction written into the vector pre-decode stage register 28-1 relates to system #0 or #1.

The state where there are values of "1" and "0" in the flag registers VPSR-VALID and VPSR-SU1, respectively, means that a vector instruction relating to system #0 is written into the vector pre-decode flag register 28-1. In this case, the logic circuit 28-2 sets the busy signal VPS-BUSY0 to "1". As shown in FIG. 9, the valid signal stored in the flag register VPSR-VALID is supplied to the AND gates 28b and 28c. The state signal stored in the flag register VPSR-SU1 is supplied to the AND gate 28b, and the AND gate 28c through the inverter 28a. The AND gates 28b and 28c output the busy signals VPS-BUSY0 and VPS-BUSY1, respectively. The state where a value of "1" is written into each of the flag registers VPSR-VALID and VPSR-SU1, means that a vector instruction relating to system #1 is written into the vector pre-decode stage register 28-1. In this case, the busy signal VPS-BUSY1 is set to "1". The busy signals VPS-BUSY0 and VPS-BUSY1 are sent to the switching control circuit 26.

Figure 10:
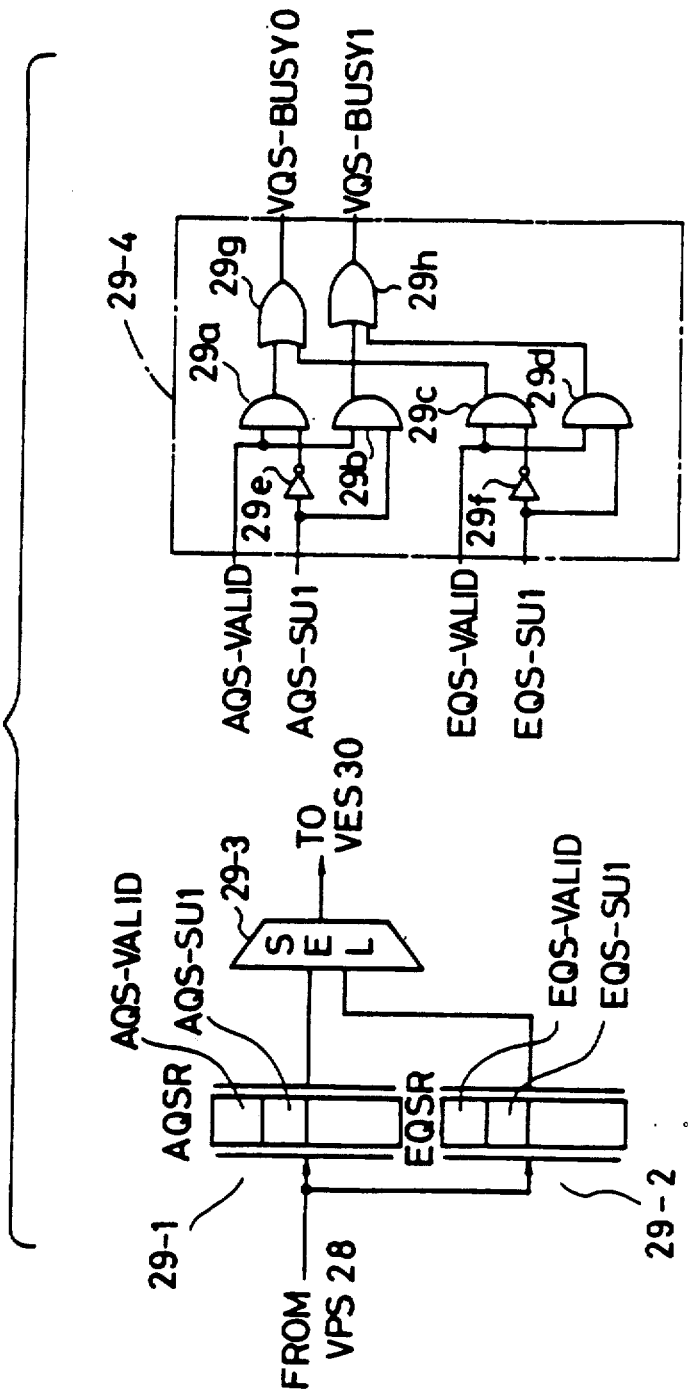
FIG. 10 is a circuit diagram of an example of the structure of a vector queue stage used in the embodiment shown in FIG. 4.

FIG. 10 illustrates an example of the structure for the vector queue stage 29. Referring to FIG. 10, the vector queue stage 29 includes a register (AQSR) 29-1, a register (EQSR) 29-2, a selector (SEL) 29-3, and a logic circuit 29-4. The register 29-1 includes flag registers AQS-VALID and AQS-SU1, and similarly the register 29-2 includes flag registers EQS-VALID and EQS-SU1. Similarly, register 29-2 includes flag registers EQS-VALID and EQS-SU1. When a vector instruction supplied from the vector queue stage 28 is a vector instruction which uses either the load pipeline 150 or the store pipeline 151, the present vector instruction is written into the register 29-1. On the other hand, when the vector instruction is a vector instruction which uses one of the addition pipeline 153, the multiplication pipeline 154 and the division pipeline 155, the above vector instruction is written into the register 29-2. When a vector instruction is written into either the register AQSR or the register EQSR, the valid signal stored in the flag register VPSR-VALID shown in FIG. 9 is written into either the flag register AQS-VALID or EQS-VALID. Simultaneously, the state signal stored in the flag register VPSR-SU1 is written into either the flag register AQS-SU1 or the register EQS-SU1. The vector instructions in the registers 29-1 and 29-2 are sequentially read out starting from an executable vector instruction contained therein, and are supplied to the vector execute stage 30.

The valid signal stored in the flag register AQSR-VALID is supplied to AND gates 29a and 29b of the logic circuit 29-4. The state signal stored in the flag register AQS-SU1 is supplied to the AND gate 29b, and the AND gate 29a through an inverter 29e. The output signals of the AND gates 29a and 29b are supplied to OR gates 29g and 29h, respectively. The valid signal stored in the flag register EQS-VALID is supplied to the AND gates 29c and 29d. The state signal stored in the flag register EQS-SU1 is supplied to the AND gate 29d, and the AND gate 29c through an inverter 29f. The output signals of the AND gates 29c and 29d are supplied to the OR gates 29g and 29h, respectively. The OR gates 29g and 29h output the busy signals VQS-BUSY0 and VQS-BUSY1, respectively, which are supplied to the switching control circuit 26. When one of the valid signals stored in the flag registers AQS-VALID and EQS-VALID is "1", and simultaneously one of the valid signals stored in the flag registers AQS-SU1 and EQS-SU1 is "0", the busy signal VQS-BUSY0 is "1". Similarly, the value of the busy signal VQS-BUSY1 is determined. The busy signals VQS-BUSY0 and VQS-BUSY1 generated in this manner are supplied to the switching control circuit 26.

Figure 11:
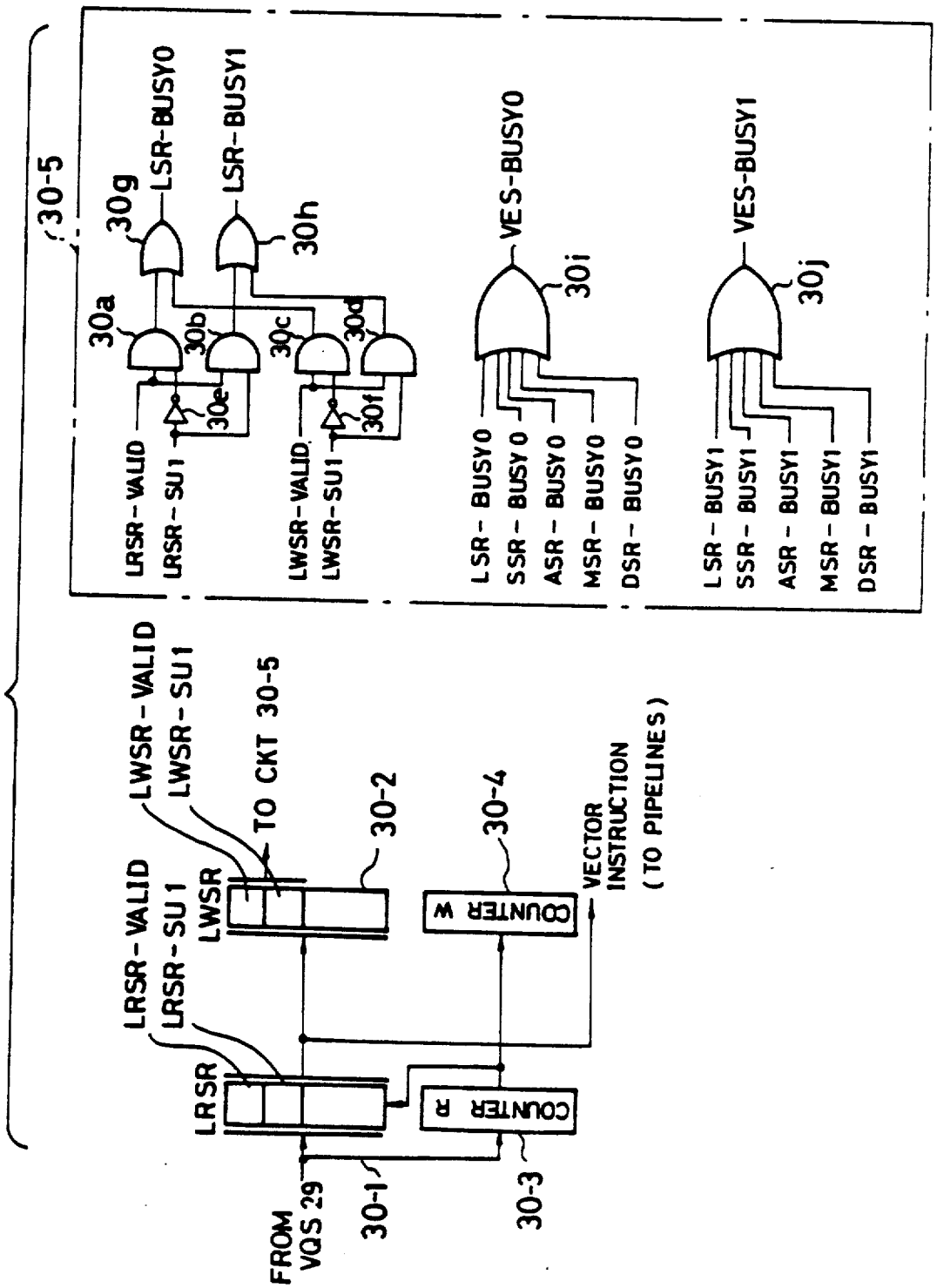
FIG. 11 is a circuit diagram of a part of a vector execute stage used in the embodiment shown in FIG. 4.

A description is given of an example of the structure for the vector execute stage 30 with reference to FIG. 11. The vector execute stage 30 has the illustrated supervisory circuit for each of the load pipeline 150, the store pipeline 151, the addition pipeline 153, the multiplication pipeline 154 and the division pipeline 155. The following description relates to the structure of the supervisory circuit provided for the load pipeline 150 (a load supervisory circuit). The supervisory circuit is made up of a register (LRSR) 30-1, a register (LWSR) 30-2, counters 30-3 and 30-4, and a logic circuit 30-5. A vector instruction supplied from the vector queue stage 29 is written into the register 30-1, which includes flag registers LRSR-VALID and LRSR-SU1. At the same time, the counter 30-3 is set to 0, and starts counting. Then, the vector instruction stored in the register 30-1 is supplied to the load pipeline 150 through the signal line 160. When the counter 30-3 counts a value determined by the received vector instruction (read time), the vector instruction is read out of the register 30-1 and is then written into the register 30-2. At the same time, the counter 30-4 is set to "0", and then starts counting. When the counted value of the counter 30-4 reaches a value indicative of a time it takes to execute the vector instruction of concern (write time), the execution of the vector instruction is ended.

A circuit made of AND gates 30a through 30d, inverters 30e and 30f, and OR gates 30g and 30h, generates busy signals LSR-BUSY0 and LSR-BUSY1 from signals stored in the flag registers LRSR-VALID, LRSR-SU1, LWSR-VALID, and LWSR-SU1. The above circuit is the same as the logic circuit 29-4 shown in FIG. 10. When a vector instruction relating to system #0 exists in either the register 30-1 or 30-2, the busy signal LSR-BUSY0 is "1". On the other hand, when a vector instruction relating to system #1 exists in either the register 30-1 or 30-2, the busy signal LSR-BUSY1 is "1".

An OR gate 30i included in the logic circuit 30-5 receives to busy signals LSR-BUSY0, SSR-BUSY0, ASR-BUSY0, MSR-BUSY0, and DSR-BUSY0 with respect to the pipelines 150, 151, 153, 154 and 155, respectively. Then the OR gate generates a busy signal VES-BUSY0, which is supplied to the switching control circuit 26. Similarly, an OR gate 30j generates a busy signal VES-BUSY1 from busy signals LSR-BUSY1, SSR-BUSY1, ASR-BUSY1, MSR-BUSY1, and DSR-BUSY1 with respect to the pipelines 150, 151, 153, 154 and 155, respectively. The busy signals VES-BUSY0 and VES-BUSY1 thus generated are supplied to the switching control circuit 26.

The present invention is not limited to the above-mentioned embodiment. For example, an arbitrary number of stages provided in the vector control unit 16 may be used. The busy signal generated at each stage may be generated based only on whether one of the scalar units 12 and 13 is related to the stored vector instruction. This is because the scalar units 12 and 13 are alternately selected. Further, the above-mentioned embodiment relates to a multiprocessor system having a plurality of scalar units and a single vector unit. However, the present invention includes a multiprocessor system which includes a plurality of small-scale execution units and a single large-scale execution unit.

The present invention is not limited to the above-mentioned embodiment, and variations and modifications may be made without departing from the scope of the present invention.

What is claimed is:

1. A multiprocessor control system for a multiprocessor system including at least two first execution units each processing a first group of instructions, and a single second execution unit processing a second group of instructions supplied from the first execution units, the second execution unit including a plurality of pipelines used for executing the second group of instructions, said multiprocessor control system comprising:

switching means coupled to the single second execution unit for selectively switching among the second group of instructions supplied from the first execution units to select the second group of instructions relating to one of the first execution units;

control stage means including a plurality of register stages used for controlling a pipeline process, for sequentially storing the second group of instructions relating to the selected one of the first execution units in the register stages and for outputting, for every register stage, a state indicating signal indicating state information for the corresponding register stage;

switching mode setting means for generating a mode setting signal to the switching means used for selecting one of a plurality of switching modes each defining a timing with which the switching by said switching means occurs; and switching control means for generating a switching signal to the switching means based on said stage indicating signals output from said control stage means and said mode setting signal indicative of one of the plurality of switching modes supplied from said switching mode setting means, said switching control means comprising:

first busy detecting means for a first one of said two first execution units, for determining whether or not the switching mode set by said switching mode setting means occurs by referring to said state indicating signal supplied from each of said register stages and said switching mode setting signal supplied from said switching mode setting means and for generating a first busy signal indicative of the determination result; and second busy detecting means for a second one of said two first execution units, for determining whether or not the switching mode set by said switching mode setting means occurs by referring to said state indicating signal supplied from each of said register stages and said mode setting signal supplied from said switching mode setting means and for generating a second busy signal indicative of the determination result, said first and second busy signals being supplied as said switching signal to said switching means.

2. A multiprocessor control system as claimed in claim 1, wherein said plurality of register stages included in said control stage means are connected in cascade, and wherein the plurality of switching modes include a switching mode in which switching by said switching means occurs when all instructions relating to said second group supplied from one of the first execution units are completely output from all of said register stages.

3. A multiprocessor control system as claimed in claim 1, wherein said plurality of register stages included in said control stage means are connected in cascade, and wherein said plurality of switching modes include a switching mode in which switching by said switching means occurs when all instructions relating to the second group supplied from one of the first execution units are completely output from a last one of said cascaded register stages, and said second group of instructions stored in said control stage means being supplied to one of the pipelines through said last register stage located at the end of said cascaded register stages.

4. A multiprocessor control system as claimed in claim 1, wherein said plurality of register stages included in said control stage means are connected in cascade, and wherein said plurality of switching modes include a switching mode in which switching by said switching means occurs when all instructions relating to said second group supplied from one of the first execution units completely go out of at least the last two of said cascaded register stages, and said second group of instructions stored in said control stage means being supplied to one of said pipelines through said last register stage located at the end of said cascaded stages.

5. A multiprocessor control system as claimed in claim 1, further comprising means for supplying a signal indicative of the timing of the switching to each of the plurality of first execution units.

6. A multiprocessor control system as claimed in claim 5, wherein each of the first execution units comprises a timer used for recording an operation time based on said signal indicative of the timing of the switching.

7. A multiprocessor control system as claimed in claim 1, wherein said control stage means comprises, for every register stage, generating means for generating said state indicating signal for each of the first execution units, and wherein said state indicating signal generated for each of said first execution units indicates whether or not at least one of the second group of instructions is stored in said corresponding register stage.

8. A multiprocessor control system as claimed in claim 1, wherein each of said first and second busy detecting means comprises:
- a plurality of first OR gates, operatively connected to two or more register stages, each performing an OR operation on said state indicating signals input from two or more register stages among said plurality of register stages, and outputting an OR operation result;
- a plurality of AND gates respectively connected to said plurality of first OR gates, each performing an AND operation on said OR operation result output from a respective one of said first OR gates and one of said plurality of switching modes, and outputting an AND operation result; and
- a second OR gate, operatively connected to said plurality of AND gates, for performing an OR operation on said AND operation results output from said plurality of AND gates, and outputting said first or second busy signal to be input to said switching circuit.

9. A multiprocessor control system as claimed in claim 1, wherein said switching means, said control stage means, said switching mode setting means and said switching control means are provided in the second execution unit.

10. A multiprocessor control system as claimed in claim 1, wherein each of the first execution units is a scalar vector unit, and said second execution unit is a vector unit.

11. A multiprocessor control system as claimed in claim 1, wherein each of the first execution units is a small-scale execution unit, and the second execution unit is a large-scale execution unit.

12. A multiprocessor control system for a multiprocessor system including two first execution units each processing a first group of instructions, and a single second execution unit processing a second group of instructions supplied from the two first execution units, the second execution unit including a plurality of pipelines used for executing the second group of instructions, said multiprocessor control system comprising:
- switching means coupled to the single second execution unit for selectively switching among the second group of instructions supplied from the two first execution units to select the second group of instructions relating to one of the two first execution units, said switching means comprising:
  - first and second flip-flops, each having set and reset terminals;
  - first and second inverters connected to said first and second flip-flops;
  - first and second AND gates, respectively connected to said first and second flip-flops; and
  - an OR gate connected to said first and second ANd gates, a first busy signal being inputted from said first inverter to said reset terminal of said first flip-flop and said set terminal of said second flip-flop, a second busy signal being inputted form said second inverter to said set terminal of said first flip-flop and said reset terminal of said second flip-flop, outputs from said first and second flip-flops being input to said first and second AND gates, respectively, and said first and second AND gates receiving the second group of instructions relating to said respective two first execution units, and outputs from said first and second AND gates being input to said OR gate which outputs the second group of instructions, related to said selected one of said two first execution units;
- control stage means including a plurality of register stages used for controlling a pipeline process, for sequentially storing the second group of instructions related to the selected one of said two execution units in the register stages and for outputting, for every register stage, a state indicating signal indicating state information for the corresponding register stage, said control stage means comprising:
  - first fetch register means, connected between a first one of said two first execution units and said switching means, for fetching the second group of instructions from said first one of said two execution units; and
  - second fetch register means, connected between a second one of said two first execution units and said switching means, for fetching the second group of instructions from said second one of said two first execution units;
- switching mode setting means for generating a mode setting signal to the switching means used for selecting one of a plurality of switching modes each defining a timing with which the switching by said switching means occurs; and
- switching control means for generating a switching signal to the switching means based on said state indicating signals output from said control stage means and said mode setting signal indicative of one of the plurality of switching modes supplied from said switching mode setting means.

13. A multiprocessor control system as claimed in claim 12, wherein said set terminal of said first flip-flop has priority over said reset terminal of said first flip-flop, and said reset terminal of said second flip-flop has priority over said set terminal of said second flip-flop.

14. A multiprocessor control system as claimed in claim 12, wherein said switching means further comprises third and fourth inverters, operatively connected to said first and second flip-flops, for inverting the outputs of said first and second flip-flops, respectively, the inverted outputs being used as said signals for controlling said timers of said respective two first execution units.

15. A multiprocessor control system as claimed in claim 12, wherein each of said first and second fetch register means comprises:
   a register for temporarily storing the second group of instructions output from the corresponding one of said two first execution units;
   a buffer, connected to said register, for buffering the second group of instructions output from the corresponding one of said two first execution units;
   a selector, connected to said register and said buffer, for selecting one of said register and buffer and connecting the selected one of said register and buffer to said switching means; and
   logic means for generating said state indicating signal based on the storage contents stored in said register and said buffer.

16. A multiprocessor control system for a multiprocessor system including two first execution units each processing a first group of instructions, and a single second execution unit processing a second group of instructions supplied from the two first execution units, the second execution unit including a plurality of pipelines used for executing the second group of instructions, said multiprocessor control system comprising:
   switching means coupled to the single second execution unit for selectively switching among the second group of instructions supplied from the two first execution units to select the second group of instructions relating to one of the two first execution units;
   control stage means including a plurality of register stages used for controlling a pipeline process, for sequentially storing the second group of instructions relating to the selected one of the first execution units in the register stages and for outputting, for every register stage, a state indicating signal indicating state information for the corresponding register stage, said control stage means comprising:
      first fetch register means connected between a first one of said two first execution units and said switching means, for fetching the second group of instructions from said first one of said two first execution units; and
      second fetch register means, connected between a second one of said two first execution units and said switching means, for fetching the second group of instructions from the second one of said two first execution units, each of said first and second fetch register means comprising:
         a register for temporarily storing the second group of instructions output from the corresponding two first execution units;
         a buffer, connected to said register, for buffering the second group of instructions output from the corresponding one of said two first execution units;
         a selector, connected to said register and said buffer, for selecting one of said register and buffer and connecting the selected one of said register and buffer to said switching means; and
         logic means for generating said state indicating signal based on the storage contents stored in said register and said buffer;
   switching mode setting means for generating a mode setting signal to the switching means used for selecting one of a plurality of switching modes each defining a timing with which the switching by said switching means occurs; and
   switching control means for generating a switching signal to the switching means based on said state indicating signals output from said control stage means and said mode setting signal indicative of one of the plurality of modes supplied from said switching mode setting means.

17. A multiprocessor control system a multiprocessor system including a plurality of first execution units each processing a first group of instructions, and a single second execution unit processing a second group of instructions supplied from the plurality of first execution units, the second execution unit including a plurality of pipelines for executing the second group of instructions, said multiprocessor control system comprising:
   switching means coupled to the single second execution unit among the second group of instructions supplied from the first execution units to select the second group of instructions relating to one of the plurality of first execution units;
   control stage means including a plurality of register stages used for controlling a pipeline process, for sequentially storing the second group of instructions relating to the selected one of the first execution units in the register stages and for outputting, for every register stage, a state indicating signal indicating state information for the corresponding register stage, said control stage means comprising:
      pre-decoding register means, connected to said switching means, for decoding said second group of instructions output from the selected one of the first execution units through said switching means to determine which one of the first execution units is associated with the second group of instructions;
      logic means for generating said state indicating signal based on the contents stored in said pre-decoding register means;
      first queuing register means, connected to said pre-decoding means, for queuing the second group of instructions related to some of the pipelines and output from the pre-decoding register means;
      second queuing register means, connected to said pre-decoding means, for queuing the second group of instructions relating to the remaining ones of the pipelines and output from said pre-decoding register means;
      a selector, connected to said first and second queuing register means, for selecting one of said first and second queuing register means so that the second group of instructions relate to the selected one of said first and second queuing register means; and
      logic means for generating said state indicating signal based on the contents stored in said first and second queuing register means;
   switching mode setting means for generating a mode setting signal to the switching means used for selecting one of a plurality of switching modes each defining a timing with which the switching by said switching means occurs; and switching control means for generating a switching signal to the switching means based on said state indicating signals output from said control stage means and said mode setting signal indicative of one of the plurality of switching modes supplied from said switching mode setting means.

18. A multiprocessor control system as claimed in claim 17, wherein said control stage means further comprises:

supervisory means for storing the second group of instructions to be input to one of said pipelines; and logic means for generating said state indicating signal based on the contents stored in said supervisory register means.

19. A multiprocessor control system as claimed in claim 17, wherein said supervisory means stores the second group of instructions for every pipeline.

* * * * *

UNITED STATES PATENT AND TRADEMARK OFFICE
CERTIFICATE OF CORRECTION

PATENT NO. : 5,001,627
DATED : MARCH 19, 1991
INVENTOR(S) : KAZUSHI SAKAMOTO

It is certified that error appears in the above-identified patent and that said Letters Patent is hereby corrected as shown below:

Col. 1, line 44, "not" should be deleted.

Col. 2, line 51, "FIG. 7 is a" should be --FIGS. 7(A)-7(C) are--.

Col. 3, line 38, "In" should be --During--.

Col. 4, line 55, "to" should be deleted;
line 66, "13" should be --13 are--;
line 68, "the" should be deleted.

Col. 5, line 17, "with precision" should be deleted;
line 34, "convenience," should be --convenience--.

Col. 7, line 35, "$\pi$" should be --#--.

Col. 9, line 59, "shown" should be deleted;
line 63, "goes out of" should be --is outputted from--.

Col. 10, line 34, "29" should be --28--;
line 56, "VFB00" should be --VFB01--.

Col. 11, line 10, "written into" should be --input to--;
line 15, "35" should be deleted; and "being" should be deleted.

Col. 13, line 34, "to" should be deleted.

UNITED STATES PATENT AND TRADEMARK OFFICE
CERTIFICATE OF CORRECTION

PATENT NO. : 5,001,627
DATED : MARCH 19, 1991
INVENTOR(S) : KAZUSHI SAKAMOTO

It is certified that error appears in the above-identified patent and that said Letters Patent is hereby corrected as shown below:

Col. 15, line 18, "plurality of" should be deleted;
         line 60, "said" should be --the--.

Col. 16, line 18, "ANd" should be --AND--;
         line 23, "form" should be --from--.

Col. 18, line 15, "system" should be --system for--;
         line 25, "unit" should be --unit for selectively switching--.

Signed and Sealed this

Twenty-ninth Day of December, 1992

Attest:

DOUGLAS B. COMER

Attesting Officer

Acting Commissioner of Patents and Trademarks